(12) United States Patent
Shima et al.

(10) Patent No.: US 7,471,433 B2
(45) Date of Patent: Dec. 30, 2008

(54) OPTICAL SCANNING APPARATUS

(75) Inventors: Kenji Shima, Numazu (JP); Akihiro Fukutomi, Mishima (JP); Taku Murotani, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 11/228,314

(22) Filed: Sep. 19, 2005

(65) Prior Publication Data

US 2006/0061865 A1      Mar. 23, 2006

(30) Foreign Application Priority Data

Sep. 22, 2004    (JP)    ............................ 2004-274959

(51) Int. Cl.
G02B 26/08     (2006.01)
(52) U.S. Cl. ...................... 359/200; 359/216
(58) Field of Classification Search .............. 359/198, 359/216, 200, 212, 223, 226
See application file for complete search history.

(56) References Cited

U.S. PATENT DOCUMENTS

| | | | |
|---|---|---|---|
| 5,357,272 A * | 10/1994 | Watanabe et al. ........... | 347/257 |
| 5,910,853 A * | 6/1999 | Yutaka ........................ | 359/200 |
| 7,019,878 B2 * | 3/2006 | Mikami ....................... | 359/216 |
| 7,137,715 B2 * | 11/2006 | Schuurmans et al. ........ | 359/841 |
| 2001/0035998 A1 * | 11/2001 | Kashiwada et al. ......... | 359/200 |
| 2005/0018326 A1 * | 1/2005 | Yoon .......................... | 359/877 |
| 2006/0061865 A1 | 3/2006 | Shima et al. ................ | 359/566 |
| 2007/0058235 A1 * | 3/2007 | Nagase ....................... | 359/216 |

FOREIGN PATENT DOCUMENTS

| | | |
|---|---|---|
| JP | 5-303050 | 11/1993 |
| JP | 6-59208 | 3/1994 |
| JP | 8-205460 | 8/1996 |
| JP | 11-133335 | 5/1999 |
| JP | 2003-295099 | 10/2003 |
| JP | 2006010814 A * | 1/2006 |

* cited by examiner

*Primary Examiner*—Stephone B. Allen
*Assistant Examiner*—Jade Callaway
(74) *Attorney, Agent, or Firm*—Fitzpatrick, Cella, Harper & Scinto

(57) ABSTRACT

The optical scanning apparatus includes a polygonal rotatable mirror which deflects a light beam emitted from a light source, a drive motor which rotates said polygonal rotatable mirror, and an optical box which holds said drive motor, wherein a fitting hole in which a bearing of said drive motor fits, is provided in said optical box, and a wall surface of this fitting hole has notch portions partially arranged. Thereby, the heat release property of the bearing of the polygonal rotatable mirror drive motor becomes good.

2 Claims, 6 Drawing Sheets

OPTICAL SCANNING APPARATUS

BACKGROUND OF THE INVENTION

1. Field of the Invention

The present invention relates to an optical scanning apparatus which is used for image forming apparatuses such as a laser printer and a laser facsimile.

2. Description of Related Art

An optical scanning apparatus (scanner unit) used for an image forming apparatus such as a laser beam printer deflects and emits a light beam, which corresponds to image information and is emitted from a semiconductor laser, with a polygonal rotatable mirror which performs a high-speed rotation. An electrostatic latent image according to the image information is formed on a photosensitive member by scanning a photosensitive member by the light beam emitted from the optical scanning apparatus. Subsequently, the electrostatic latent image on the photosensitive member is visualized in a toner image by a developing apparatus, and this is transferred to a recording medium such as recording paper. The recording medium is sent to a fixing apparatus after that, and printing is completed by performing the heat fixing of the toner on the recording medium.

In recent years, acceleration of the image forming apparatus progresses, and in order to correspond to this acceleration, also in an optical scanning apparatus, the rotating speed of a polygonal rotatable mirror arrives at several tens of thousands of rpm increasingly.

By the way, a mounting structure to the scanner unit of a polygonal rotatable mirror drive motor which is provided in a scanner unit, is common as the structure disclosed in Japanese Patent Application Laid-Open No. 2003-295099. The structure is shown in FIG. 9.

As shown in FIG. 9, a polygonal rotatable mirror 22 is put on a flange 23 installed on a rotary shaft 20, and is fixed by a leaf spring 21. The rotary shaft 20 is inserted rotatably into bearing sleeve 31, and an end of the rotary shaft 20 contacts with a thrust plate 32 to constitute a rotor 24. The rotor 24 is arranged so as to face a stator coil 26. The motor in this embodiment has the dynamic pressure liquid bearing structure that the dynamic pressure generating groove 25 is formed in the rotary shaft 20 and oil is contained in the sleeve 31. When a current flows into the stator coil 26, the rotor 24 rotates, and thereby, the polygonal rotatable mirror 22 also rotates.

A motor drive circuit is mounted on a printed board 27 which is made of metal. This printed board 27 is fixed to a printed board mounting surface 30 provided on the outer periphery of the bearing sleeve 31 by a joint method such as caulking. Hence, the printed board 27 and bearing sleeve 31 can be dealt as one piece. In addition, the printed board 27 is fixed to a mounting surface 28 of an optical box 29, which contains a lens, not shown, the above-mentioned drive motor, and the like, with fixing means such as screws. At this time, the bearing sleeve 31 is engaged in a hole, provided in the optical box 29, with almost no gap.

This structure has a merit that the drive motor for the rotation of the polygonal rotatable mirror 22 is simply mounted in the optical box 29 of a scanner unit, and is effective for the cost reduction of the scanner unit.

Nevertheless, when an optical scanning apparatus with such structure is mounted in a high-speed printer with a large number of output sheets per unit time, the following subjects should be taken into consideration. In order to make an optical scanning apparatus correspond to high-speed printing, there are a method of increasing the number of faces of a polygonal rotatable mirror, a method of increasing a number of light beams, a method of increasing the rotational speed of a polygonal rotatable mirror, and the like. Among these, when setting the rotational speed of a polygonal rotatable mirror highly, there arises a problem that the temperature of a bearing of the polygonal rotatable mirror drive motor rises and the durability of the motor falls. In particular, when the rotational speed of a polygonal rotatable mirror is high, the loss in a bearing also becomes large, and a calorific quantity is also large, and hence, this problem becomes still more remarkable.

What is conceivable so as to solve the above-mentioned problems is means of mounting a metal heat release member in a bearing as described in, for example, Japanese Patent Application Laid-Open H5-303050 and Japanese Patent Application Laid-Open H6-59208. Nevertheless, this causes another problem that a part count increases and the component cost of an optical scanning apparatus increases.

SUMMARY OF THE INVENTION

The present invention is accomplished in view of the above-described subjects.

An object of the present invention is to provide an optical scanning apparatus excellent in the heat release property of a bearing of a polygonal rotatable mirror drive motor.

Another object of the present invention is to provide an optical scanning apparatus excellent in the heat release property of a bearing of a polygonal rotatable mirror drive motor with suppressing cost.

A further object of the present invention is to provide an optical scanning apparatus comprising: a polygonal rotatable mirror which deflects a light beam emitted from a light source; a drive motor which rotates said polygonal rotatable mirror; and an optical box which holds said drive motor, wherein a fitting hole in which a bearing of said drive motor fits is provided in said optical box, and an inner surface of the fitting hole has a plurality of notch portions.

A still further object of the present invention will become clear by reading the following detailed explanation with referring to accompanying drawings.

DETAILED DESCRIPTION OF THE PREFERRED EMBODIMENTS

Embodiment 1

An optical scanning apparatus of a first embodiment according to the present invention will be described using FIGS. 1 to 4.

Figure 1:
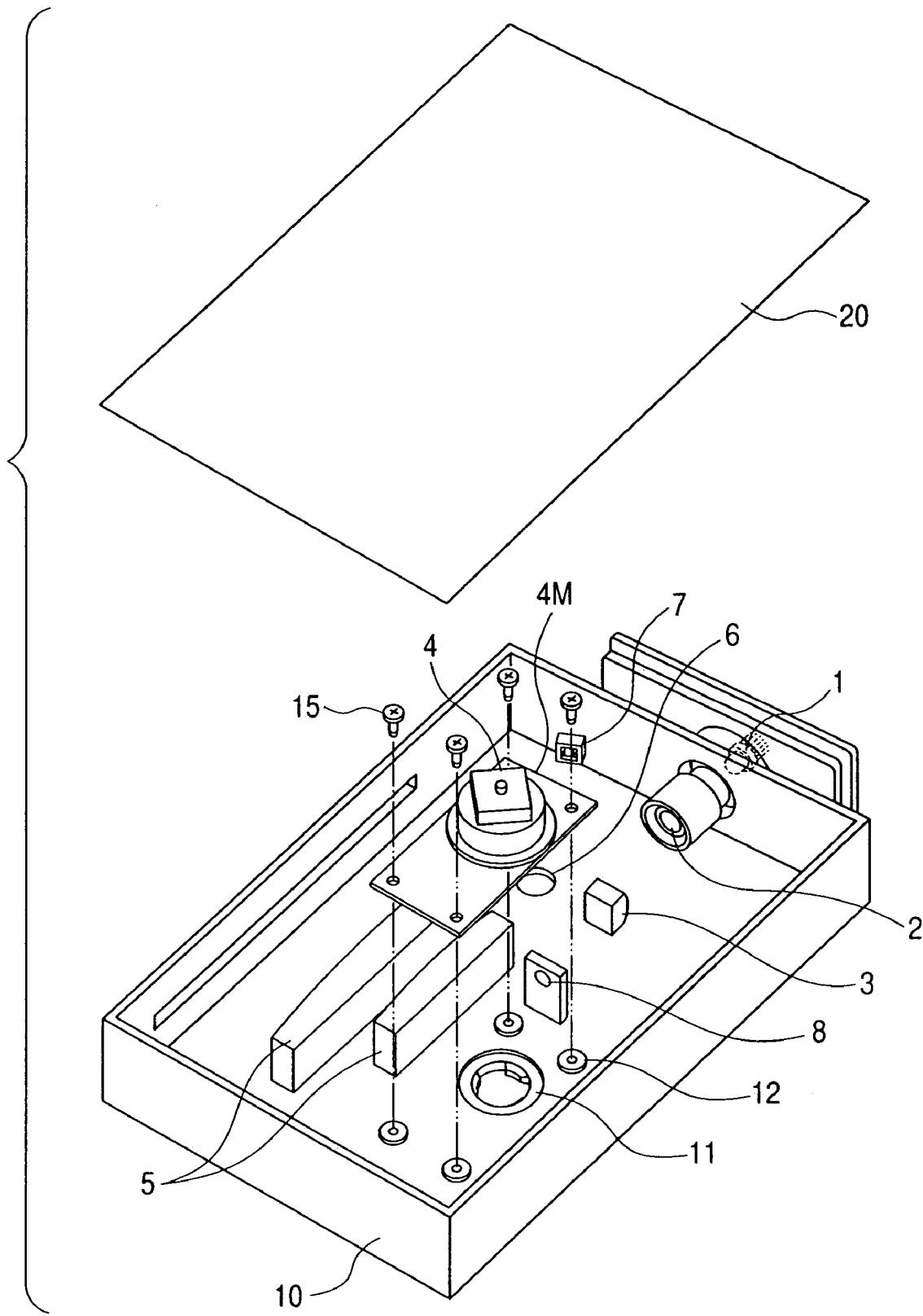
FIG. 1 is a perspective view showing an optical scanning apparatus of a first embodiment.

FIG. 1 is a perspective view showing the optical scanning apparatus of a first embodiment according to the present invention. On an optical path in front of a semiconductor laser 1, a collimator lens 2, a cylindrical lens 3, an aperture 8, and a polygonal rotatable mirror 4 are arranged one by one, and an imaging lens 5 is arranged on an optical path in a reflecting direction of the polygonal rotatable mirror 4. Furthermore, an optical system 6 for horizontal synchronization detection and a sensor 7 for horizontal synchronization detection are provided in a predetermined portion of the reflecting direction of the polygonal rotatable mirror 4. The polygonal rotatable mirror 4 is installed in a motor 4M rotating this. These are held with an optical box 10 made of a resin, and are blocked up by a cover member 20 made of a resin or a metal. An fitting hole 11 for installing the motor 4M is provided in a predetermined position of the optical box 10. Seat surfaces 12 into which screws 15 are secured are provided near the fitting hole 11. A shape of the vicinity of this fitting hole 11 will be described in detail using FIG. 2 later.

A light beam emitted from the semiconductor laser 1 is made to be approximately parallel light by the collimator lens 2, and is shaped by the aperture 8 and is condensed linearly on the polygonal rotatable mirror 4 by the cylindrical lens 3. The light beam which condensed to the polygonal rotatable mirror 4 is deflected by the polygonal rotatable mirror 4 in a predetermined direction vertical to a rotary shaft, and is imaged on a rotating drum-like photosensitive member through the imaging lens 5. The light beam imaged on the photosensitive member forms an electrostatic latent image in connection with main scanning by the rotation of the polygonal rotatable mirror, and vertical scanning by the rotation of the rotating drum. In addition, after a part of the light beam deflected by the polygonal rotatable mirror 4 passes the optical system 6 for horizontal synchronization detection, it is introduced into the horizontal synchronizing signal detector 7. The semiconductor laser 1 starts write modulation in the timing according to an output signal from the horizontal synchronizing signal detector 7.

Figure 2:
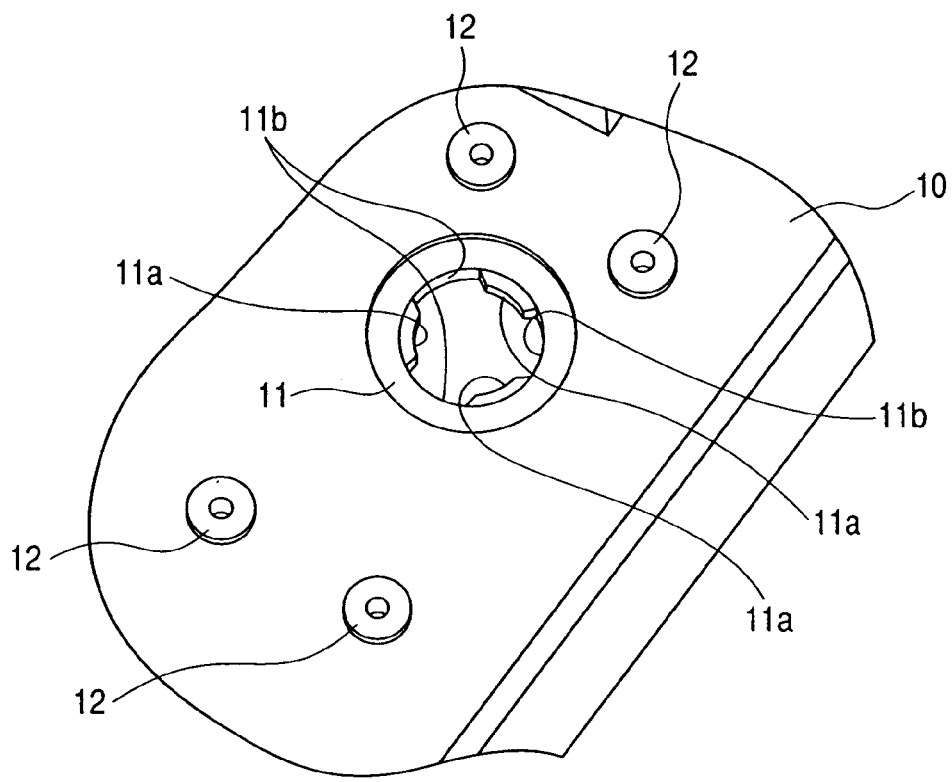
FIG. 2 is a perspective view showing a shape of a motor mounting part in the optical scanning apparatus of the first embodiment.

FIG. 2 is an enlarged view showing a shape of a motor mounting portion of the optical box 10. The fitting hole 11 having a shape into which a bearing of the motor 4M fits is provided in a bottom face of the optical box 10. The fitting hole 11 is constituted of fitting portions 11a and notch portions 11b. A diameter of the portion of the fitting portions 11a has a shape corresponding to an outer diameter of the bearing 4M2 shown in FIG. 3. The notch portions 11b having a curvature with a diameter larger than the diameter of the portion of the fitting portions 11a is provided in an inner circumferential face of a cylindrical wall face of the fitting hole 11. In addition, a seat surface 12 is provided near the fitting hole 11.

Figure 3:
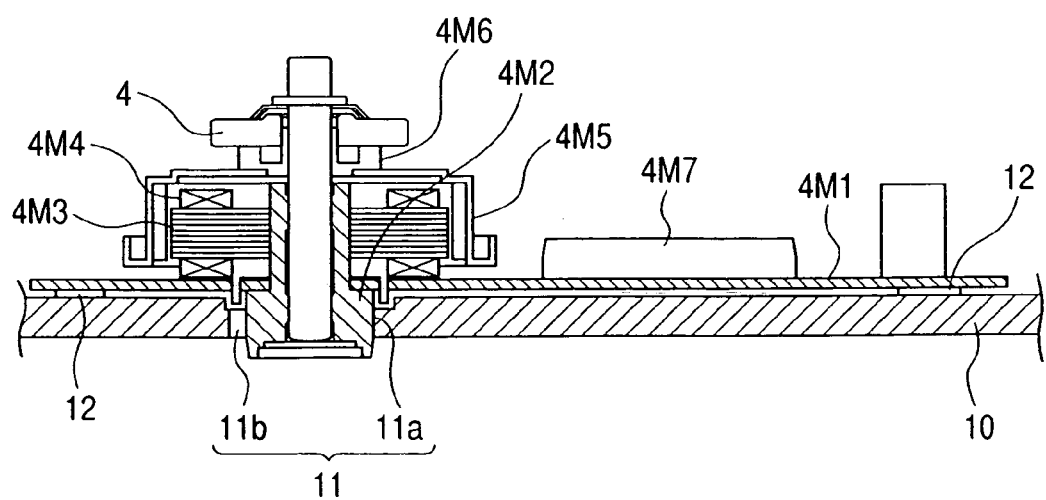
FIG. 3 is a sectional view showing a mounting state of a motor in the optical scanning apparatus of the first embodiment.
Figure 4:
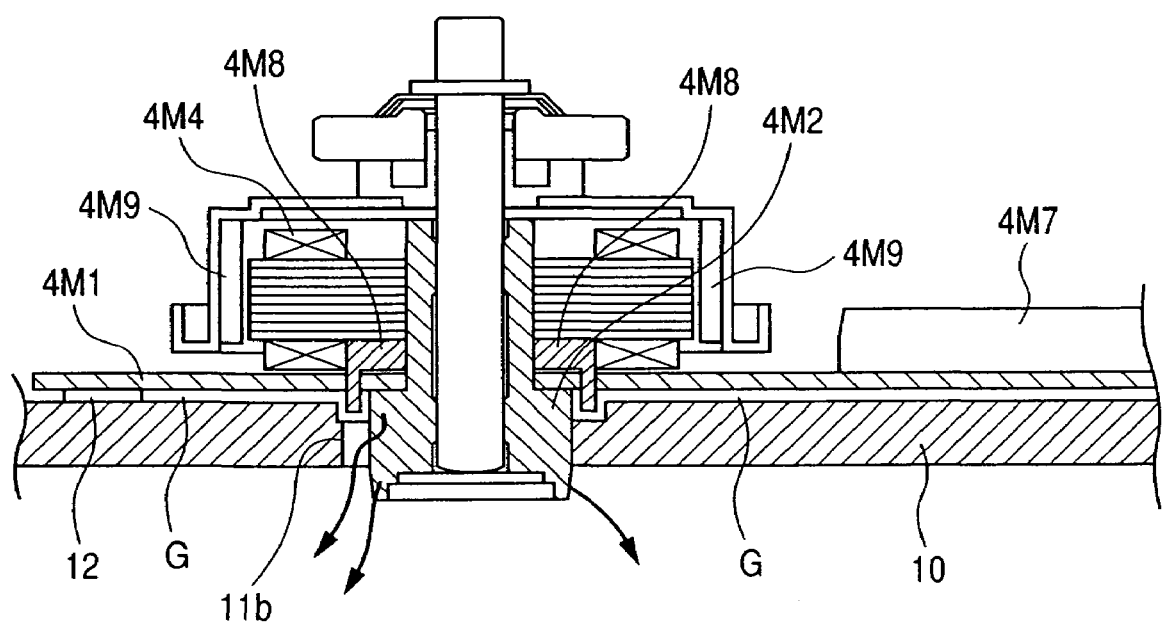
FIG. 4 is an enlarged view of FIG. 3, and is a conceptual drawing showing an aspect of heat release of a bearing.

FIG. 3 is a sectional view showing a state that the motor is mounted on the optical box. FIG. 4 is an enlarged view of FIG. 3. The motor 4M is constituted of a motor board(printed board) 4M1 which is made of iron and is caulked to a metal bearing 4M2, and a magnetic circuit composed of a stator implemented on the motor board 4M1, a rotor facing this, and the like. A surface of the motor board 4M1 is coated in insulation, and a motor driver 4M7 and a circuit pattern are provided on this insulating coat. The stator has a stator core 4M3 provided on the motor board 4M1 through a stator supporting member 4M8 made of resin, and a stator coil 4M4 which is wrapped around this. In addition, a rotor 4M5 is fixed to a flange portion 4M6 mounted on the rotary shaft, and a magnet 4M9 is mounted on an inner circumferential surface of the rotor 4M5. The polygonal rotatable mirror 4 is pressed to the flange portion 4M6 by a pressure bar spring, or the like. Hence, the polygonal rotatable mirror 4 is linked with the rotor 4M5 integrally through the above-mentioned flange portion. When the rotor 4M5 rotates by the above-mentioned stator being excited, the polygonal rotatable mirror also rotates. The rotation control of the motor 4M is performed by the motor driver 4M7. In addition, the cylindrical bearing 4M2 is projected from a backside of the motor board 4M1. Furthermore, the bearing 4M2 is commonly made of a metal such as brass.

In the mounting of the motor 4M to the optical box 10, positioning is performed using the fitting hole 11 and seat surface 12. The positioning of the motor 4M in a horizontal direction (scanning direction) is performed by the bearing 4M2 being engaged with the fitting hole 11, and the bearing 4M2 being supported by the fitting portions 11a and notch portions 11b. In addition, the seat surface 12 is higher than the bottom face of the optical box 10, and the positioning of the motor 4M in a vertical direction is performed by the motor board 4M1 being placed on the seat surface 12. Then, as shown in FIG. 1, the motor 4M is firmly fixed to the optical box 10 with fixing screws 15. Hence, the motor 4M is fixed to the optical box 10 by the motor board 4M1 being fixed to the optical box 10.

As mentioned above, since the optical scanning apparatus of this embodiment has the structure that the fitting hole which is provided in the bottom face of the optical box, and to which the bearing of the motor is engaged is cut partially, it has a feature of excelling in the heat release property of heat occurring in the bearing.

FIG. 4 is an enlarged view of the vicinity of the bearing of the motor in the optical scanning apparatus of this embodiment. Reference character G denotes a gap (air-gap) between the bottom face of the optical box 10, and the motor board 4M1. As mentioned above, in the fitting hole 11 (see FIG. 2), the notch portions 11b are arranged partially. Therefore, although the bearing 4M2 is supported by the fitting portions 11a (see FIG. 2), a region where the bearing 4M2 contacts with air outside the optical box can be enlarged in comparison with a conventional optical scanning apparatus.

When the rotation of the polygonal rotatable mirror and rotor is continued at the time of a continuous print operation and the like, heat occurs from the bearing 4M2 and motor driver 4M7. The bearing 4M2 of this embodiment is an oil dynamic pressure bearing where lubricating oil is poured into an interior space, and a calorific quantity becomes large when especially rotating speed is high. In addition, when rotating speed, is high, a current which flows into the stator coil 4M4 also becomes large, and hence, the calorific quantity from the vicinity of the bearing becomes large.

Nevertheless, since the optical scanning apparatus of this embodiment has the above-mentioned structure, as shown by an arrow in the FIG. 4, it is possible to release heat occurring from not only a bottom end section of the bearing but also an outer peripheral portion of a cylindrical section of the bearing in the notch portion 11b, to the external of the optical box. As a result, when the polygonal rotatable mirror is continuously rotated at high speed at the time of continuous print operation and the like, it is possible to release the heat occurring from the bearing 4M2, stator coil 4M4, and the like efficiently, and to suppress the temperature rise of the bearing 4M2. The lower the temperature of the bearing 4M2 is at the time of motor rotating, the longer the lifetime of the motor can be extended. Hence, it is possible to attain the long lifetime of an optical scanning apparatus by using the structure of this embodiment.

Figure 5:
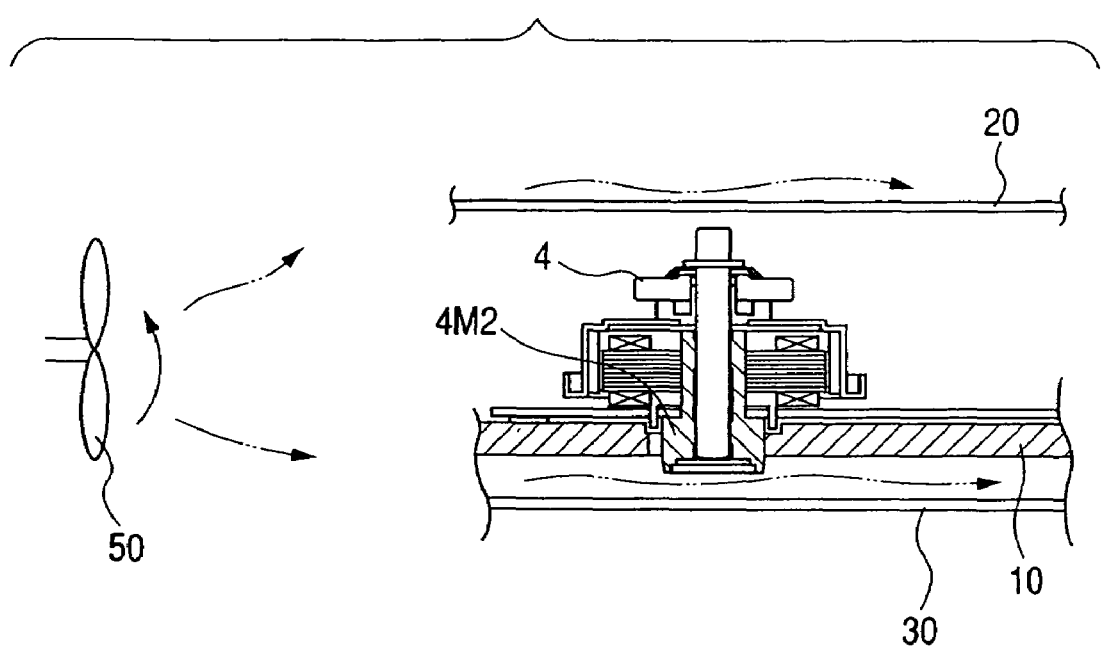
FIG. 5 is an explanatory diagram about an effect of a cooling fan.

In addition, FIG. 5 is a schematic diagram showing an aspect of cooling of an optical scanning apparatus in an image forming apparatus using the optical scanning apparatus of this embodiment. As shown in the diagram, it is common to provide a cooling fan 50 in a main body of an image forming apparatus. In addition, in this embodiment, the optical scanning apparatus is fixed on the optical bench 30 which is made of sheet metal and becomes a part of a body frame of the image forming apparatus. Hence, as shown by a wavy line arrow in the diagram, airstreams are formed in a bottom of the optical box 10 and a top of the cover member 20. As mentioned above, since the notch portions 11b are provided in the fitting hole where the bearing 4M2 of the motor is engaged, this is such structure that an area that the bearing 4M2 contacts the air outside the optical box becomes large. Hence, when the optical scanning apparatus of the present invention is used in an image forming apparatus with such structure, it is possible to attain increasingly the long lifetime of the bearing since it is possible to enhance a cooling effect of the bearing by the cooling fan.

In addition, since it is common that the optical box 10 is produced by injection molding which uses a mold, cost increase by providing the notch portions 11b in the fitting hole 11 as mentioned above for FIG. 2 hardly occurs. Hence, it is possible to provide a low-price optical scanning apparatus in comparison with the case that a metal heat release member and the like are mounted as a separate part.

As explained above, since the notch portions are arranged partially in the fitting hole of the optical box in the optical scanning apparatus of this embodiment, it is possible to provide the optical scanning apparatus in a low price which has long lifetime and is excellent in the heat release property of the motor bearing to correspond to the high-speed rotation of the polygonal rotatable mirror. Furthermore, it is possible to provide an image forming apparatus which corresponds to high-speed printing and has long lifetime in a low price, by applying the optical scanning apparatus of this embodiment to the image forming apparatus.

In addition, in the description of this embodiment, an aspect that three notch portions of the fitting hole are provided in equal intervals of 120 degrees is illustrated and explained. Nevertheless, even if this has the structure different from this embodiment, for example, four places since it is not necessary to limit this to three places as the gist of the present invention, it is needless to say that the same effect is obtained. Nevertheless, it is preferable to provide three or more notch portions 11b as shown in FIGS. 3 and 4 (in other words, three or more fitting portions 11a as shown in FIG. 3) so as to secure the horizontal positioning accuracy of the motor.

Embodiment 2

Figure 6:
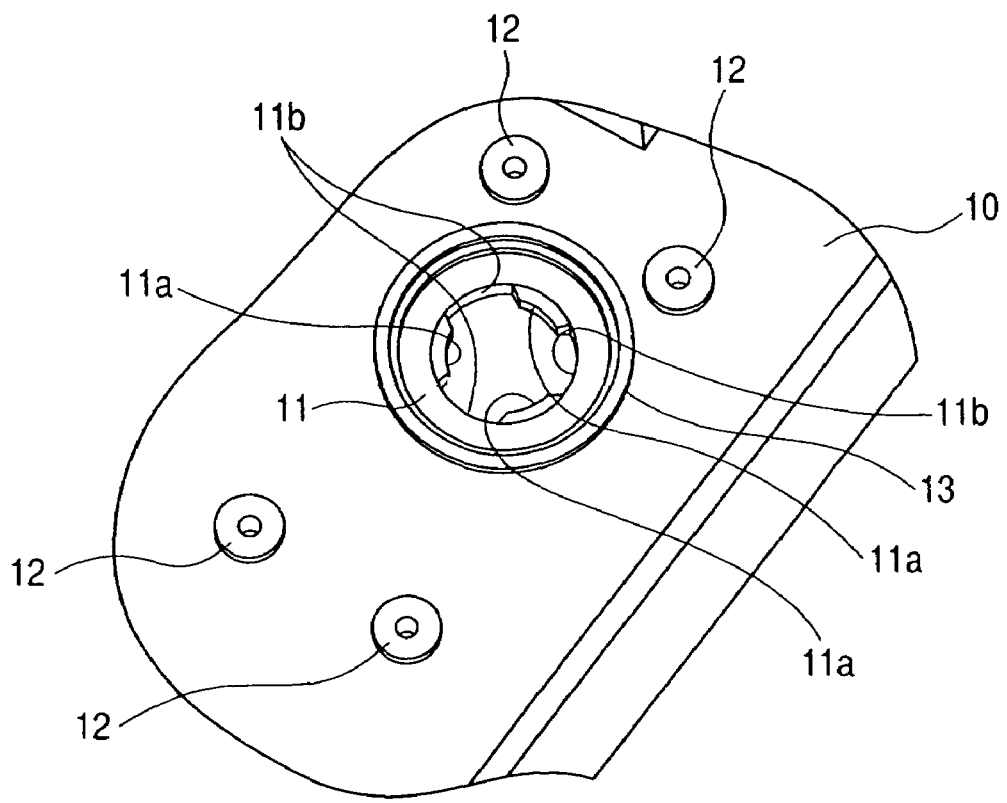
FIG. 6 is a perspective view showing a shape of a motor mounting part in an optical scanning apparatus of a second embodiment.

FIG. 6 is a perspective view showing the vicinity of a motor mounting part of an optical box in an optical scanning apparatus of a second embodiment according to the present invention. In addition, since it is the same as those explained in detail in the first embodiment about fundamental structure, its operation, and the like of the entire optical scanning apparatus, detailed explanation is omitted here.

The fitting hole 11 composed of the fitting portions 11a and notch portions 11b, and the seat surface 12 on which the motor board 4M1 sits is provided in the bottom face of the optical box 10 similarly to the first embodiment. Furthermore, an annular rib 13 is provided in the periphery of the fitting hole 11. As for the height of the rib 13, the rib 13 is set so as to become lower slightly than the seat surface 12. Hence, there never arise drawbacks such as tilt of a motor shaft by the contact of the motor board 4M1 (see FIG. 3) and rib 13.

Figure 7:
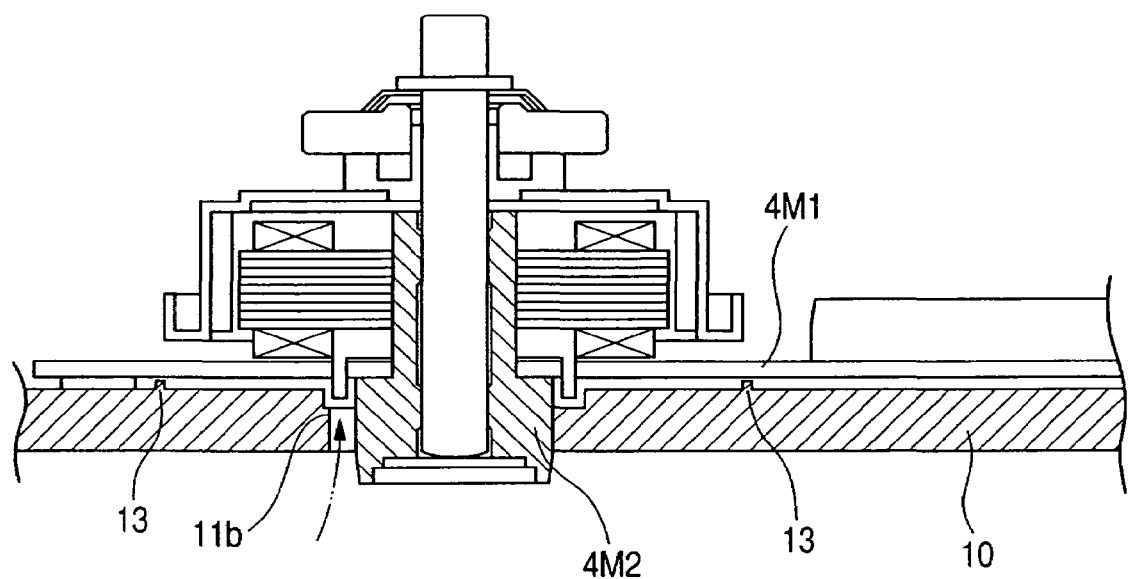
FIG. 7 is a conceptual drawing explaining an action of a rib.

FIG. 7 is a sectional view showing an aspect of the motor being mounted to the optical box in the optical scanning apparatus of this embodiment. Identical reference numerals used to identify components in the first embodiment correspond to the same component in other embodiments. Similarly to the first embodiment, at the time of the mounting of the motor 4M (see FIG. 1) to the optical box 10, the motor 4M is positioned by the fitting portions 11a of the fitting hole 11 (see FIG. 6) and the seat surface 12 (see FIG. 6), and the motor board 4M1 is firmly tightened together with screws. The effect of progress in the heat release property of the bearing 4M2 by the notch portions 11b provided in the fitting hole 11 (see FIG. 6) is the same as that of the description in the first embodiment.

Figure 8:
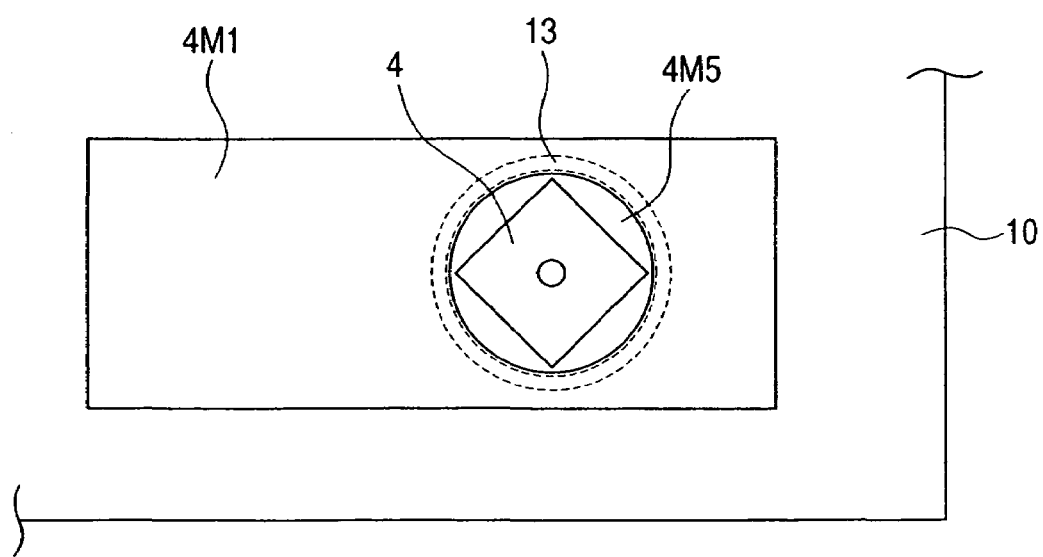
FIG. 8 is a plan explaining an optimal shape of the rib.
Figure 9:
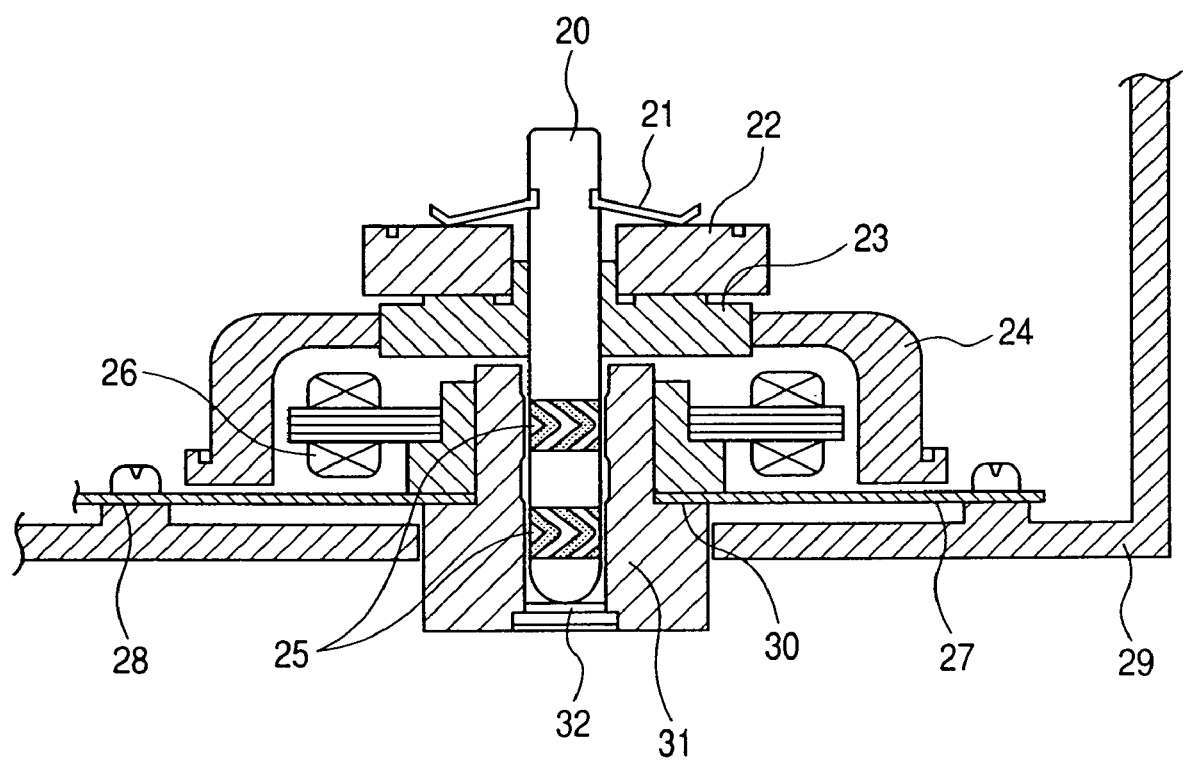
FIG. 9 is a sectional view for explaining relation between a motor bearing and an optical box of a conventional optical scanning apparatus.

FIG. 8 is a schematic diagram from the viewpoint of the above part of the motor 4M (see FIG. 1) for explaining the position of the above-mentioned rib 13. As shown in FIG. 7, the circumferential rib 13 is produced in the size a little smaller than an external form of the motor board 4M1, and has a shape of filling mostly a gap between the motor board 4M and optical box 10.

In the optical scanning apparatus of this embodiment, as mentioned above, since the rib 13 is provided in the periphery of the fitting hole 11 (see FIG. 6) of the optical box 10, it is possible to enhance the sealability of the optical scanning apparatus and it has an advantage of excelling in dust resistance.

When the rotational speed of the polygonal rotatable mirror 4 is high, it may arise that dust outside the optical box invades inside the optical box through the notch portions 11b (see FIG. 6) as shown by a wavy line arrow in FIG. 7, by the occurrence of the convection current accompanying the rotation of the polygonal rotatable mirror 4. However, since the circumferential rib 13 is provided in the periphery of the fitting hole 11 (see FIG. 6) in the optical scanning apparatus of this embodiment, dust outside the optical box collides with a wall of the rib 13 even if the dust invades through the notch portions 11b. Hence, it is possible to suppress the diffusion of the dust inside the optical box. Hence, it is possible to suppress the image deterioration by the deposit of dust on the polygonal rotatable mirror, scanning lens, and the like.

As explained above, the optical scanning apparatus of this embodiment has the structure that the notch portions are arranged partially in the fitting hole of the optical box, and the annular rib is provided in the periphery of the fitting hole. Hence, it is possible to provide an optical scanning apparatus which is excellent in the heat release property of the motor bearing to correspond to the high-speed rotation of the polygonal rotatable mirror, can suppress image deterioration by the invasion of dust, and has long lifetime in a low price.

The present invention is not limited to the above-described examples, but includes modifications within technological idea.

This application claims priority from Japanese Patent Application No. 2004-274959 filed Sep. 22, 2004, which is hereby incorporated by reference herein.

What is claimed is:

1. An optical scanning apparatus comprising:
   a polygonal rotatable mirror which deflects a light beam emitted from a light source;
   a drive motor which rotates said polygonal rotatable mirror at high speeds and has a bearing that generates heat from the high speed rotation and a board mounted on the bearing; and
   an optical box that has a fitting hole in a bottom face engaged with the bearing to hold said drive motor and that has seat surfaces on the bottom face of said optical box, each of the seat surfaces having a height to form a gap between the bottom face of said optical box and the board,
   wherein said drive motor is mounted inside said optical box through the bearing fitted in the fitting hole and is fixed to said optical box by fixing the board on the seat surfaces, and
   wherein the fitting hole has a plurality of notch portions to draw heat from the bearing outside said optical box and an annular rib protruding inside said optical box so as to surround an outer periphery of the fitting hole of said optical box and be in an area in which the board is projected onto the bottom portion of said optical box.

2. An optical scanning apparatus according to claim 1, wherein a height of the rib is lower than a height of each of the seat surfaces.

* * * * *